United States Patent
Glassman

(10) Patent No.: US 7,154,608 B1
(45) Date of Patent: Dec. 26, 2006

(54) PHASE-PRESERVING AMPLIFIER FOR A STELLAR INTERFEROMETER

(75) Inventor: Jack Glassman, Edwardsville, IL (US)

(73) Assignee: The Board of Trustees of Southern Illnois University, Edwardsville, IL (US)

( * ) Notice: Subject to any disclaimer, the term of this patent is extended or adjusted under 35 U.S.C. 154(b) by 102 days.

(21) Appl. No.: 10/978,299

(22) Filed: Oct. 29, 2004

Related U.S. Application Data

(60) Provisional application No. 60/515,885, filed on Oct. 29, 2003.

(51) Int. Cl.
*G01B 9/02* (2006.01)
(52) U.S. Cl. .................................... 356/450
(58) Field of Classification Search ........... 356/450
See application file for complete search history.

(56) References Cited

U.S. PATENT DOCUMENTS

| | | | | |
|---|---|---|---|---|
| 4,505,588 A * | 3/1985 | Ludman et al. | ............. | 356/477 |
| 5,812,305 A * | 9/1998 | Blake et al. | ................. | 359/330 |
| 6,483,592 B1 * | 11/2002 | Pedigo | ......................... | 356/450 |
| 6,744,518 B1 * | 6/2004 | Dress et al. | ................. | 356/450 |
| 6,775,053 B1 * | 8/2004 | Jovanovic et al. | ........... | 359/328 |
| 2002/0001321 A1 * | 1/2002 | Perry | .......................... | 372/22 |
| 2003/0128423 A1 * | 7/2003 | Jovanovic et al. | ........... | 359/349 |
| 2006/0033923 A1 * | 2/2006 | Hirasawa et al. | ............ | 356/450 |

OTHER PUBLICATIONS

Hecht, Eugene. Optics. 4th Edition. 2002. pp. 573-578.*
Korystov et al. Interferometry of Spontaneous Parametric Down Conversion. QELS '01, 2001. p. 69.*

* cited by examiner

*Primary Examiner*—Deandra M. Hughes
(74) *Attorney, Agent, or Firm*—Sierra Patent Group, Ltd.

(57) ABSTRACT

A phase-preserving amplification system for stellar interferometers is disclosed. In one embodiment, a pair of crystals are provided that are configured to receive an optical signal from a source such as a telescope. A pump inputs a high energy field into the crystals, amplifying the optical signals using optical parametric amplification (OPA). A beam combiner receives and combines the amplified signals and a data collection element collects the combined amplified signals.

6 Claims, 5 Drawing Sheets

High visibility interferogram

Low visibility interferogram

PHASE-PRESERVING AMPLIFIER FOR A STELLAR INTERFEROMETER

CROSS-REFERENCE TO RELATED APPLICATIONS

This application claims the benefit of U.S. Provisional Application Ser. No. 60/515,885, filed Oct. 29, 2003.

BACKGROUND

Stellar interferometers are a powerful tool for astronomers interested in structure not resolvable with a normal telescope. In its simplest form, epitomized by the Michelson stellar interferometer as illustrated in FIG. 1, light collected from the same object by a pair of telescopes 110 or other generic light-gathering systems separated by some distance is combined by a beam combiner 120, such as a beamsplitter, lens, or optical fibers.

The two signals are made to overlap on an imaging surface, such as a piece of photographic film, historically, or a charge coupled device (CCD) in modern applications. Note that the distances over which the beams are transported from their respective telescopes to the beam combiner are typically not the same. An adjustable delay is usually incorporated into the system. According to the van Cittert-Zernike (VCZ) theorem, the signals will be partially coherent with respect to each other, so the combined signal will form an interference pattern known as an interferogram. Examples of high- and low-visibility interferograms are shown in FIG. 2.

The visibility of the fringes, defined as $$V = \frac{I_{max} - I_{min}}{I_{max} + I_{min}},$$

where $I_{max}$ is the intensity of the maxima of the fringe pattern and $I_{min}$ is the intensity of the minima of the fringe pattern, is directly proportional to the mutual coherence of the light at the positions of the two telescopes. Again, according to the VCZ theorem, the distribution of the mutual coherence, as a function of telescope separation and the direction of the line (the "baseline"—defined in the frame of reference of the object) connecting them, is proportional to the Fourier transform of the optical intensity distribution at the original object.

By recording interferograms along a series of different baselines, the Fourier transform (1-d or 2-d) of the object's optical intensity can be obtained by analyzing the visibilities of the fringe patterns of the various interferograms as a function of telescope separation and baseline orientation. The use of more than two telescopes speeds the process: Since any pair of telescopes can be used to generate an interferogram, the use of N telescopes gives one access to N! pairs without any change in telescope position. The Fourier transform can be inverted to give useful information about the object (e.g., its angular extent).

To create a useful interferogram, the phase of the spectral component of interest in the original signal must be preserved. In the optical regime, the measurement and/or recording of the phase of the signal directly is not feasible. Interferograms must be made in real time either one pair at a time (increasing the time of observation by a factor of N!) or, if N apertures are used, by splitting each signal into N−1 channels (decreasing the field strength by $(N-1)^1$).

For weak signals (and even the best astronomical signal is quite weak), a means of amplifying the signals collected by the telescopes while retaining their phase would increase the efficiency of these systems, allowing large systems to collect better data faster or allowing systems too small to be useful without amplification to collect useful data.

One phase-preserving method of amplifying an optical signal is Optical Parametric Amplification (OPA). OPA is the mixing of two optical fields in a crystal (such as, but not limited to KDP, KTP, LNBO, BBO, PPLN, and PPKTP) having nonlinear optical ($c^{(2)}$) properties resulting in some of the energy of one being transferred to the other'. The high energy field is known as the "pump." The other input field is known as the "seed." After the OPA process, the amplified seed is known as the "signal." Also emerging from the crystal are residual pump energy and an optical signal known as the "idler." (The idler carries away energy and momentum left over after the transfer from the pump to the signal.)

SUMMARY OF THE INVENTION

OPA is used to boost the signal strength in each of the "arms" of a stellar interferometer. After light is collected by the telescopes, it is amplified in one or more crystals pumped by one or more lasers. The signals are combined and interferograms are created with much higher signal to noise ratios than would have been possible otherwise. The wavelength amplified can be selected by adjusting the angle made between the pump and seed beams and the crystal axis. Pulsed operation allows the system to be insensitive to atmospheric turbulence.

DETAILED DESCRIPTION

Figure 1:
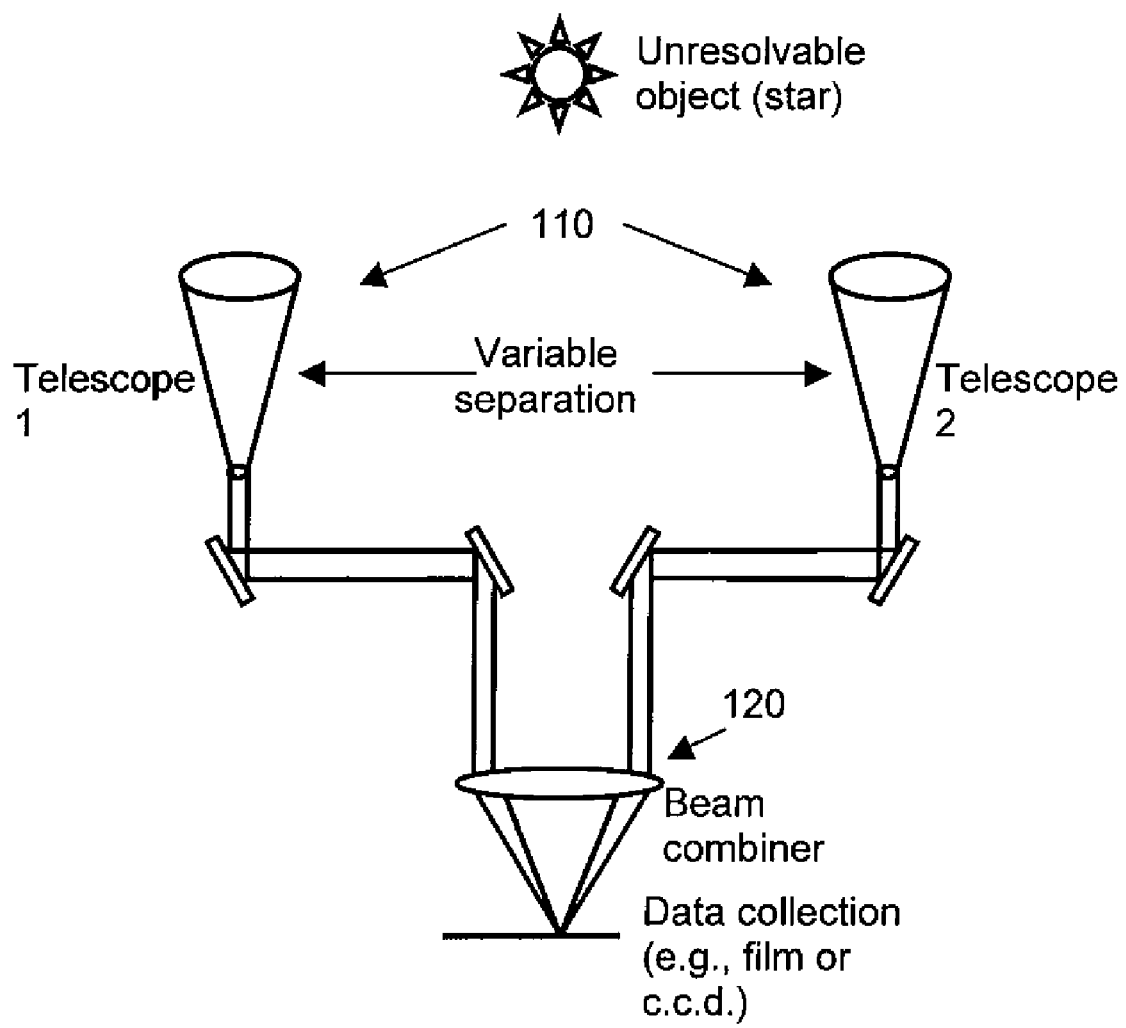
FIG. 1 is a diagram of a prior art Michelson stellar interferometer.
Figure 2:
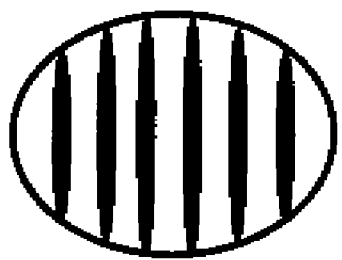
FIG. 2 shows interferograms illustrating high and low visibility patterns.
Figure 2:
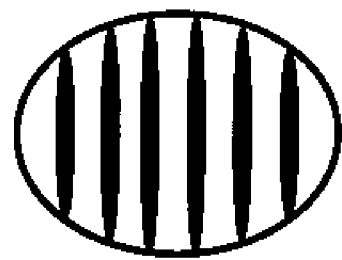

Persons of ordinary skill in the art will realize that the following description is illustrative only and not in any way limiting. Other modifications and improvements will readily suggest themselves to such skilled persons having the benefit of this disclosure. In the following description, like reference numerals refer to like elements throughout.

In this disclosure, OPA is used to boost the optical signal strength from one or more telescopes in an interferometric configuration to increase the signal to noise ratio. The teachings of this disclosure provide for the collection of better quality data with a given aperture size, the collection of data in a shorter time for a given aperture size, and allow different spectral regions to be amplified selectively. Pulsed pump operation allows individual interferograms to be taken in a time very short compared to timescales associated with atmospheric turbulence, so the effects of that turbulence are not present on a single interferogram. A number of such interferograms could be post-processed and added together, eliminating the effects of atmospheric turbulence over an arbitrarily long period of time. This is a significant advantage over amplification by stimulated emission ("laser amplification"), which is another phase-preserving amplification system. Another advantage of OPA over laser amplification is the ability to select and tune the spectral region to be amplified. Also, quantum mechanical noise may be lower with OPA.

The key feature of OPA for this application is that the signal propagates in the same direction and has the same phase as the seed. For non-monochromatic or non-unidirectional seeds, it is contemplated that a Fourier decomposition of the seed can be conducted and each spectral or directional component can be considered to be amplified independently so long as the pump energy is not significantly depleted and so long as all the signals remain very small compared to the pump. Only the amplitude of the seed is changed, being amplified by as much as several orders of magnitude—gains of 10,000 to 100,000 are routinely obtained.

The amplification occurs over a modest bandwidth, several nanometers, so spectral properties are retained within a range. Outside of that range, amplification falls off rapidly. The central frequency of the region amplified is determined by the geometry of the system. Thus, two signals which yielded interferograms with signal to noise ratios requiring hours of observation could be amplified to yield interferograms requiring only a few seconds of observation for the same quality of data. Similarly, telescopes with apertures orders of magnitude smaller than those needed for practical unamplified operation could yield useful data.

Figure 3:
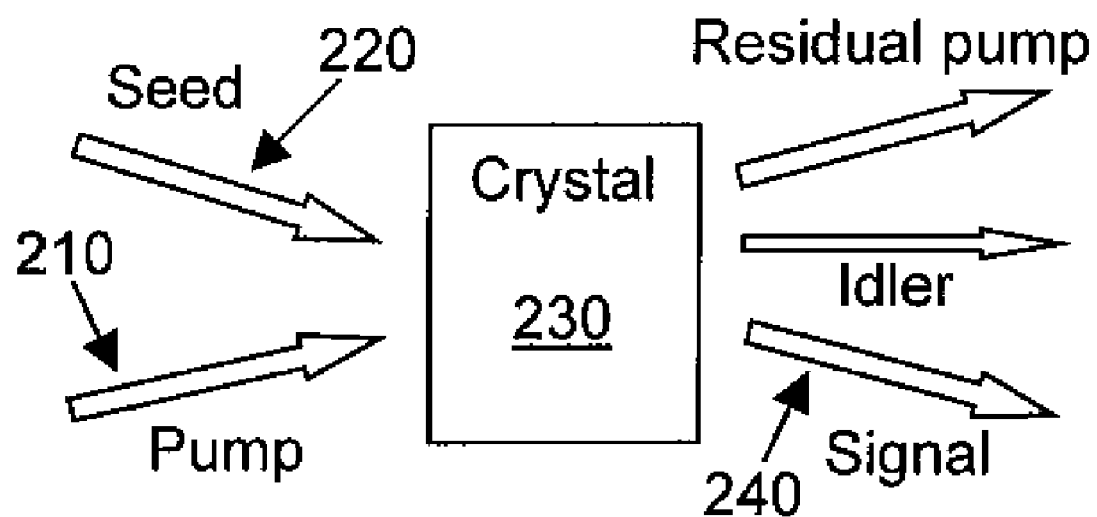
FIG. 3 is a diagram of a crystal used for OPCPA showing the input and output beams.

FIG. 3 shows a crystal configuration in accordance with the teachings of this disclosure. In the systems of this disclosure, a laser is used as a pump 210 for one or more appropriate crystals. In some possible geometries, more than one laser might be used. In this case synchronization of the two pump signals would be required.

One pump beam 210 is needed for each seed beam 220, although a single pump beam can be optically split into several useable pieces. The pump can be either continuous wave (cw) or pulsed. The output from each telescope acts as a seed 220 to be amplified.

Each desired seed beam is sent into the crystal 230 which is to amplify it at the appropriate angle with respect to that beam's pump and the crystal itself. Since OPA is an instantaneous process (i.e., the seed is amplified only when it coexists in the crystal with an appropriate pump field), in order to form a useful interferogram from a given pair of telescopes, the pump beams which are to amplify the seeds from the respective telescopes must be synchronized between the two, although they need not be simultaneous: A delay between a pair of amplifications might be useful for a given observation. To form an interferogram, amplified signals must be present simultaneously at the data collection stage. Amplification can be implemented at any position between the telescope and the imaging surface.

The seed fields could be conducted from the telescope to their appropriate crystal(s) by optical fibers for convenience. Or, the amplification could occur in one place and the amplified signal(s) sent via fiber to another stage of the system.

The angles made by the seed, the pump, and the crystal's axis are determined by the crystal's properties, the wavelength of the pump, and the central wavelength of the spectral region being amplified. Thus different spectral components could be selectively amplified by adjusting the angles made by the input fields and the crystal. The output signals 240 might be sent through one or more additional OPA stages. (The main limitation on any single stage of amplification is the amount of pump intensity the crystal can endure before damaging.)

Figure 4:
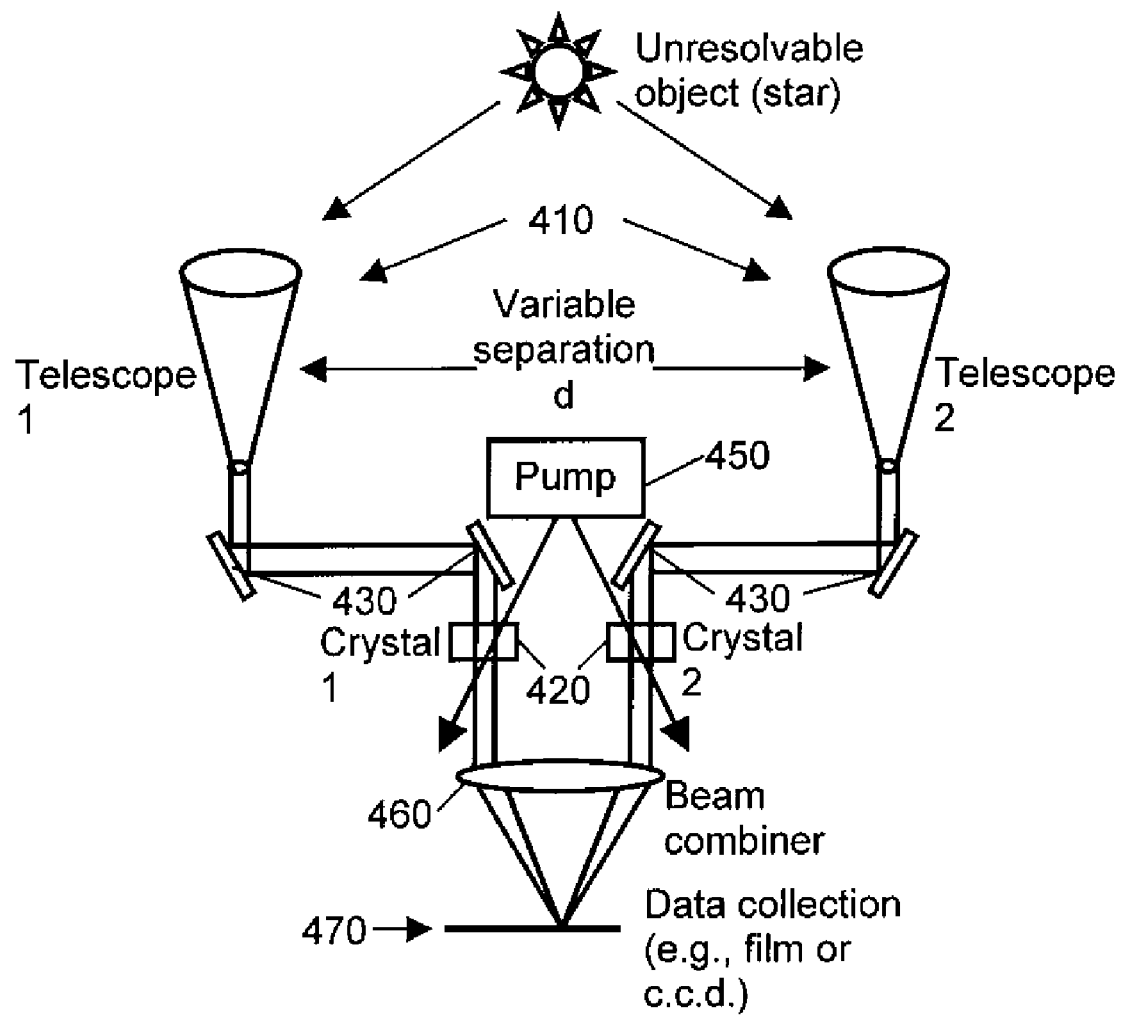
FIG. 4 is a diagram showing geometry for a stellar interferometer with OPCPA to boost signal strength in accordance with the teachings of this disclosure.
Figure 5:
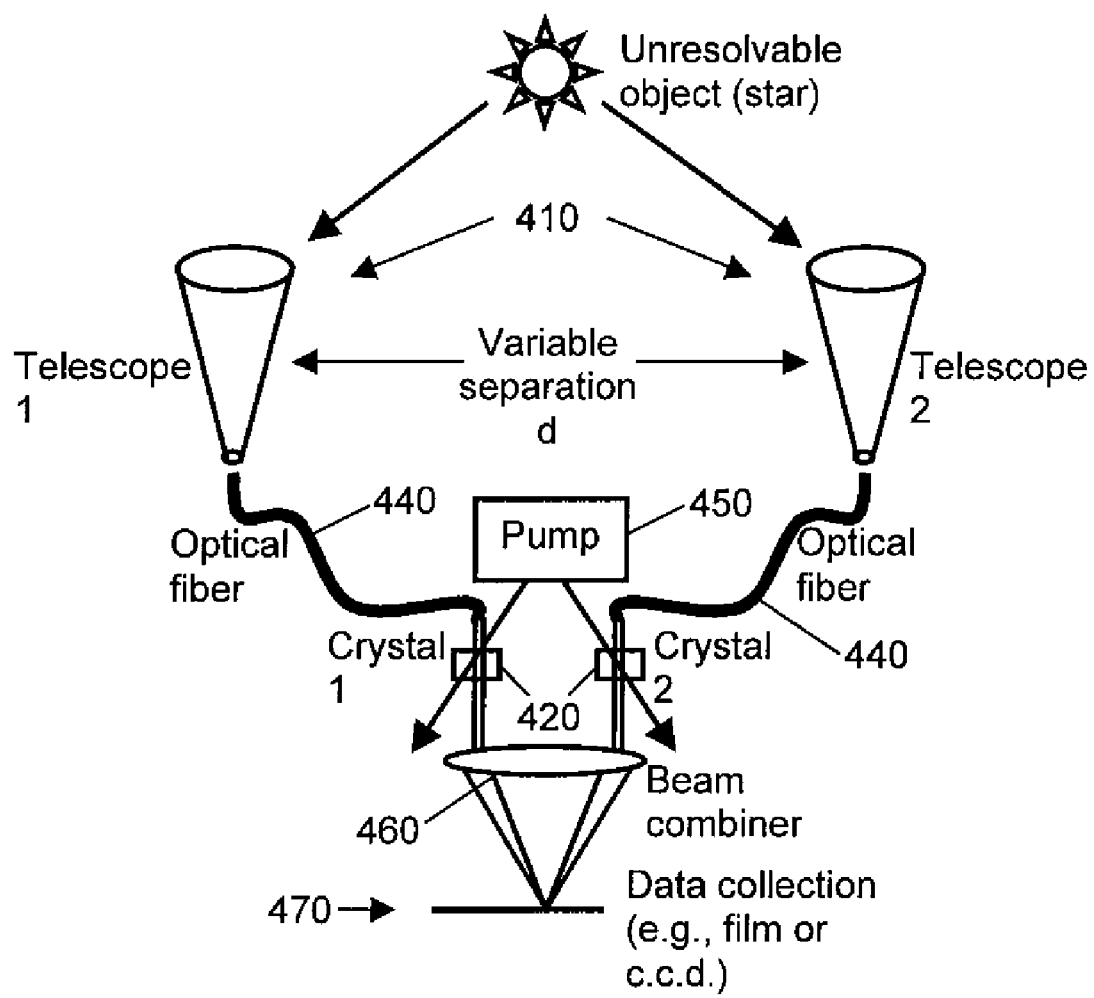
FIG. 5 is a diagram showing another embodiment of geometry for a stellar interferometer with OPCPA to boost signal strength incorporating optical fibers for beam transport in accordance with the teachings of this disclosure.

FIGS. 4 and 5 collectively illustrate two possible geometries for a interferometer configured in accordance with the teachings of this disclosure. FIGS. 4 and 5 include a pair of telescopes 410 separated by a distance d. The output of the telescopes are then fed into respective crystals 420. In FIG. 4, the signals may be guided through a series of mirrors 430, and in FIG. 5, the signal is fed through the use of optical fibers 440. The crystals 420 are pumped by a pump 450 to amplify the signals using an OPA process as described above.

To form the interferograms, the output signals are combined in a beam combiner 460 and the interferogram is collected using an appropriate device 470, such as photographic film, CCD, phosphor, or other electronic or non-electronic image collection systems. Multiple images could be collected with the same setting of the system and statistically processed after the observation or a real-time averaging could be made.

While embodiments and applications of this disclosure have been shown and described, it would be apparent to those skilled in the art that many more modifications and improvements than mentioned above are possible without departing from the inventive concepts herein. The disclosure, therefore, is not to be restricted except in the spirit of the appended claims.

The invention claimed is:

1. A phase-preserving amplification system for stellar interferometers comprising:
   a first crystal configured to receive an optical signal from a first source;
   a second crystal configured to receive an optical signal from a second source;
   at least one pump configured to input a high energy field into said first and second crystals, thereby amplifying said received optical signals;
   a beam combiner configured to receive and combine amplified signals from said first and second crystals; and
   a data collection element configured to receive collect said combined amplified signals.

2. The phase-preserving amplification system of claim 1, wherein said optical signals are amplified using optical parametric amplification (OPA).

3. The phase-preserving amplification system of claim 2, wherein said received optical signals comprises the seed and said high energy field comprises the pump for OPA.

4. A phase-preserving amplification system for stellar interferometers comprising:
   first and second crystal means for receiving an optical signal from a first and second source, respectively;
   pump means for inputting a high energy field into said first and second crystal means, thereby amplifying said received optical signals;
   beam combiner means for receiving and combining amplified signals from said first and second crystals; and
   data collection means for collecting said combined amplified signals.

5. The phase-preserving amplification system of claim 4, wherein said optical signals are amplified using optical parametric amplification (OPA).

6. The phase-preserving amplification system of claim 5, wherein said received optical signals comprises the seed and said high energy field comprises the pump for OPA.

* * * * *